United States Patent [19]

Imanaka

[11] Patent Number: 5,208,792
[45] Date of Patent: May 4, 1993

[54] RECORDING AND REPRODUCING APPARATUS USING OPTO-MAGNETO MEDIA

[75] Inventor: Ryoichi Imanaka, Hirakata, Japan

[73] Assignee: Matsushita Electric Industrial Co., Ltd., Osaka, Japan

[21] Appl. No.: 527,846

[22] Filed: May 24, 1990

[30] Foreign Application Priority Data

May 29, 1987 [JP]  Japan .................................. 1-134915
Jul. 14, 1989 [JP]  Japan .................................. 1-182876

[51] Int. Cl.[5] ........................ G11B 7/00; G11B 7/095; G11B 11/12
[52] U.S. Cl. .................................. 369/44.38; 369/32; 369/48; 369/44.28; 369/13; 360/114
[58] Field of Search ............... 369/44.37, 44.38, 44.41, 369/44.42, 116, 121, 13, 56, 47, 48, 44.14, 32, 47, 58, 59, 13; 360/114

[56] References Cited

U.S. PATENT DOCUMENTS

| | | | |
|---|---|---|---|
| 4,507,763 | 3/1985 | Kato ................................. | 369/44.37 |
| 4,642,703 | 2/1987 | Endo ................................. | 360/114 |
| 4,962,301 | 10/1990 | Rokutan .............................. | 369/59 |
| 4,969,137 | 11/1990 | Sugiyama et al. ................... | 369/32 |
| 4,998,231 | 3/1991 | Watanabe et al. .................. | 360/114 |
| 5,007,039 | 4/1991 | Sakemoto et al. ................... | 369/116 |
| 5,043,960 | 8/1991 | Nakao et al. ........................ | 360/114 |

FOREIGN PATENT DOCUMENTS 1-196703  8/1989  Japan .

OTHER PUBLICATIONS

SPIE Optical Data Storage Topical Meeting, vol. 1078, pp. 98–104, "Multi-beam magneto-optical disk drive for parallel read/write operation", Los Angeles, California.
Patent Abstracts of Japan, vol. 11, No. 93 (P-559) Mar. 1987, & JP-A-61 243975 (Sony Corp) Oct. 1986.
Patent Abstracts of Japan, vol. 11, No. 9, (P-534) Jan. 1987, & JP-A-61 184744 (Canon Inc) Aug. 1986.
Patent Abstracts of Japan, vol. 9, No. 239 (P-391) Sep. 1985 & JP-A-60 093646 (Suwa Seikosha KK) May 1985.

*Primary Examiner*—Aristotelis Psitos
*Assistant Examiner*—Thang V. Tran
*Attorney, Agent, or Firm*—Stevens, Davis, Miller & Mosher

[57] ABSTRACT

An apparatus is provided for recording and reproducing information signals on an opto-magnetic disk at a high speed using plural light beams. The phase relation between the information signals is fixed when they are simultaneously recorded and reproduced on plural tracks of the disk. The overwrite of simultaneously performing erasing and recording of the information signals is executed using the plural beams.

3 Claims, 9 Drawing Sheets

OUTPUT OF 41, 46

CK 36d

MAGNETIC FIELD 21

LASER OUTPUT 2a, 2b

TEMPERATURE OF RECORDING FILM

RECORDING DOMAIN

P

LASER POWER

T

TEMPERATURE OF
RECORDING FILM

H

MAGNETIC FIELD

MAGNETIC
DIRECTION OF
RECORDING FILM

S

BEAM SPOT                    RECORDING
                             TRACK

RECORDING AND REPRODUCING APPARATUS USING OPTO-MAGNETO MEDIA

BACKGROUND OF THE INVENTION

The present invention relates to an 'optomagnetic recording system' in which signals are recorded by irradiating a magnetic medium with optical energy to increase local temperature thereof and also applying a magnetic field thereto, and more particularly to an opto-magnetic recording system which can execute 'overwrite' recording using a plurality of light beams.

Several techniques for executing overwrite recording have been proposed. One of them is to record information signals by irradiating an opto-magnetic medium with a light beam and also modulating a magnetic field.

This prior art technique is disclosed in JP-Appln. 63-20514 (which has been laid open as JP-A-196703) filed by the inventors of the present invention. In this technique, information signals are recorded on the magnetic medium of an opto-magnetic disk in such a manner that a signal at a single frequency is applied to a magnetic circuit to provide a modulator for modulating a light beam to be in synchronism with the signal, and a magnetic field generated by the magnetic circuit is synchronized with the information signal obtained by modulating the light beam. This technique will be explained in more detail with reference to FIGS. 7, 8 and 9.

FIG. 7 is a schematic view of a recording system according to the prior art (JP-A-1-196703). FIG. 8 is a timing chart of the operation in FIG. 7.

In FIG. 7, 201 is an opto-magnetic disk; 202 is a recording film having recording tracks (not shown); 203 is an objective lens; 204 is a light beam incident on the recording film, which constitutes a beam spot focused on the recording film by lens 203; and 205 is a magnetic circuit in which a coil 206 is wound. The magnetic circuit 205 generates a magnetic flux 207 when the coil 206 is supplied with a current, and a magnetic field H on the recording film 202.

The operation theory will be explained with reference to the timing charts of FIGS. 8A to 8E. FIG. 8A shows power of the laser light incident on the objective lens 203, which is modulated as shown. This laser light is focused as beam spots on the recording film 202 by the objective lens 203 as shown in FIG. 8E. The laser power has been modulated as shown in FIG. 8A so that the temperature of the recording film 202 varies as shown in FIG. 8B. When the magnetic field as shown in FIG. 8C is applied to the areas of the recording film 202 where the temperature exceeds $T_1$, the temperature at each area exceeds the Curie point so that the magnetizing directions on these areas of the recording film 202 are defined as shown in FIG. 8D. The diameter of each of the beam spots as shown in FIG. 8E is set to be equal to or larger than the inverting interval of the magnetic field so that the magnetizing directions of S, N, S, . . . are alternatively recorded on the recording film 202 as shown in FIG. 8D.

FIG. 9 is a graph showing the temperature rise and fall in the recording film 202 when laser light is radiated to the recording film. The laser light used is pulsative light having a pulse width of 100 nsec. The recording film 202 formed on the opto-magnetic disk 201 moves at a relative speed of about 14.1 m/sec for the irradiating point of the laser light. The power of the irradiated laser light is set for about 3 mW. The laser power and the temperature of recording film 202 shown in FIGS. 8A and 8B, respectively, can be read in FIG. 9. In FIG. 8, the abscissa represents the distance ($\mu$m) from the center of the radiated beam spot and the ordinate represents the temperature of the recording film. Distribution of the temperature after 100 nsec to 500 nsec has passed from the time when radiation of the laser pulse is started is illustrated. With the magnetic field always inverted in the directions of S and N, if the temperature of the recording film 202 is caused to exceed the Curie point when the magnetic field is in the S direction, the corresponding area is magnetized in the S direction. Likewise, the corresponding area can be magnetized in the N direction. In this way, information signals can be recorded on the recording film 202.

However, the prior art has the following drawback and problems remaining to be solved. Generally, in order to record information signals on and reproduce them from an opto-magnetic disk at a high speed, it is necessary to increase the relative speed between the opto-magnetic disk and an optical head. However, the relative speed is limited to a certain degree since the increased relative speed requires an increased laser output for recording. On the other hand, the present invention intends to record/reproduce information signals at a high speed without increasing the relative speed. In accordance with the present invention, a plurality of laser beams can be tracked on a plurality of tracks of the optical disk, and an overwrite function can be provided. If information signals are to be recorded or reproduced from different positions using plural light beams, the information signals recorded at the different positions must be in a fixed phase relation.

Further, the optical disk for recording information signals using the plural light beams must not be peculiar i.e., it must be a standard, commercially used disk. The present invention also intends to solve the above problems.

SUMMARY OF THE INVENTION

The present invention improves the prior art technique disclosed in JP-A-1-196703. In order to solve the above problems, in accordance with the present invention, a magnetic field is modulated by prescribed signal, and also tracks are scanned by plural light beams, and the light beams are modulated by the signals in synchronism with said prescribed signal to record information signals on predetermined tracks.

Further, using an optical disk having usual spiral or concentric tracks, a plurality of laser beams individually detect the positions of the tracks being scanned to record information signals at different positions of the tracks.

In this way, in accordance with the represent invention, a plurality of light beams are tracked on concentric or spiral tracks, information signals are divided into plural channels, and the plurality of light beams are modulated by the plural signals so that the information signals are recorded at different positions of the tracks. In reproduction, the information signals recorded at the different positions are simultaneously reproduced using plural light beams, and restored into the original information signal belonging to a single channel. The concentric or spiral tracks may be replaced by the conventional tracks for executing recording/reproduction using a single beam. Therefore, compatibility can be taken between an optical disk recorded using a signal laser beam and another optical disk recorded using plural laser beams.

Thus, in accordance with the present invention, a single magnetic field modulator and a plurality of light beams can be combined to record information signals simultaneously on a plurality of tracks and provide an overwrite function.

DESCRIPTION OF THE PREFERRED EMBODIMENTS

Figure 1:
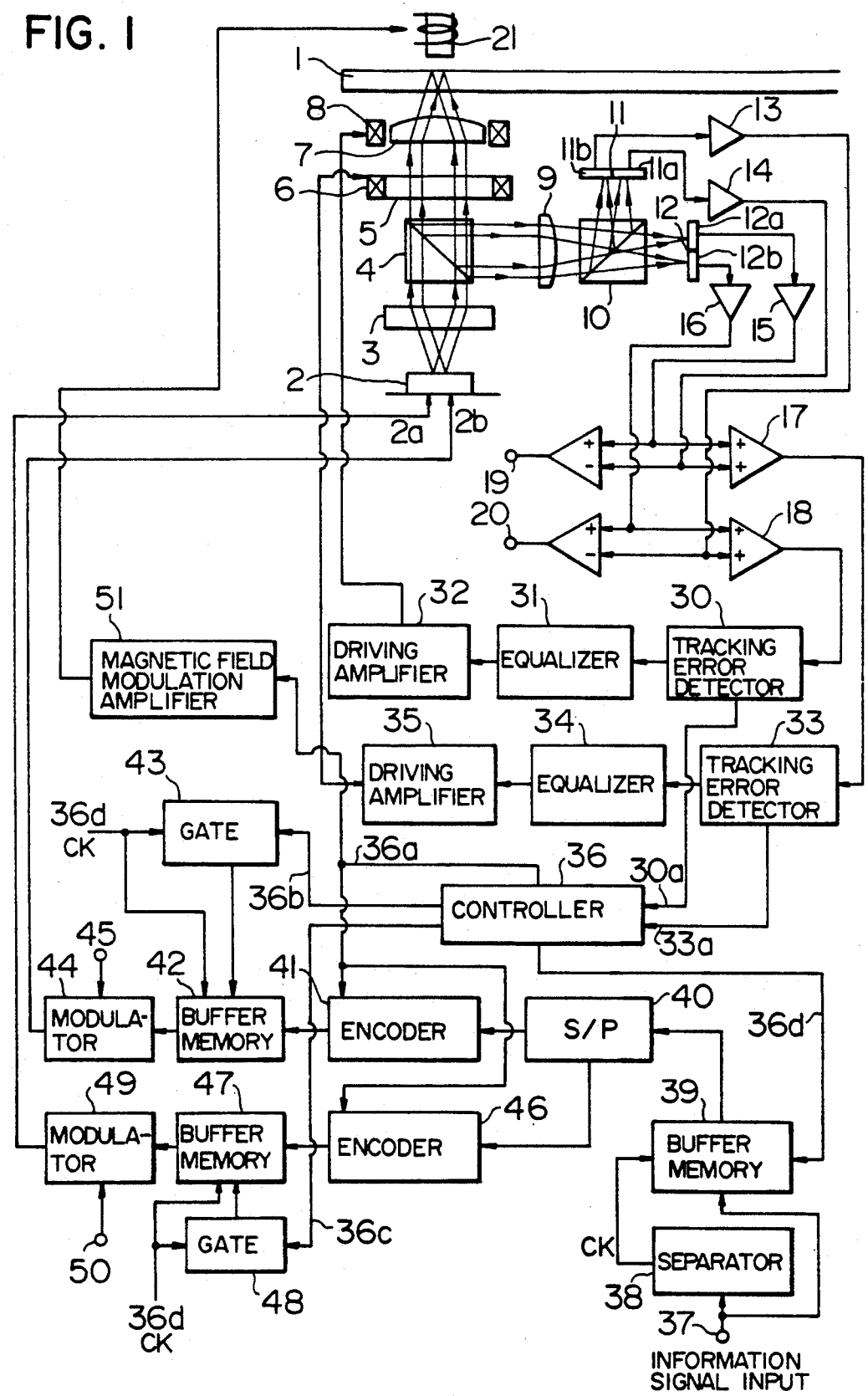
FIG. 1 is a block diagram of an embodiment of the recording/reproducing apparatus according to the present invention.

FIG. 1 shows an embodiment of the recording/reproducing apparatus according to the present invention. In FIG. 1, 1 is an opto-magnetic disk; 2 is a semiconductor laser emitting two light beams 2a, 2b; 3 is a collimator lens; 4 is a beam splitter; 5 is an image rotary prism which is e.g. a Dove prism; 6 is a rotary actuator for rotating the prism 5; and 7 is an objective lens which is displaced in a radial direction of the opto-magnetic disk 1 by a tracking actuator 8. The objective lens can be shifted in a focusing direction (not shown). 9 is a lens for enlarging the light beam reflected from the opto-magnetic disk 1 and projecting the images thus formed on photo-detectors 11 and 12 through a polarized light beam splitter 10. 13 and 14 are amplifiers for individually converting two outputs from the two-divided photo-detectors 11a, 11b into voltages; and 15 and 16 are amplifiers for individually converting two outputs from the two-divided photo-detectors 12a, 12b into voltages.

17 is an adder for adding the outputs from the amplifiers 14 and 15; and 18 is an adder for adding the outputs from the amplifiers 13 and 16. Additionally, a laser beam 2a is focused onto corresponding track of the optomagnetic disk 1, and the laser beam reflected therefrom is guided to the photo-detectors 11a and 12a. Likewise, a laser beam 2b is guided to the photo-detectors 11b and 12b Thus, the adder 17 provides an output of an information signal of pre-pit reproduced using the laser beam 2a whereas the adder 18 provides an output of an information signal of pre-pit using the laser beam 2b. Further, a differential amplifier 19 provides an output of the opto-magnetic signal reproduced using the laser beam 2a whereas a differential amplifier 20 provides an output of the opto-magnetic signal reproduced using the laser beam 2b.

Figure 3:
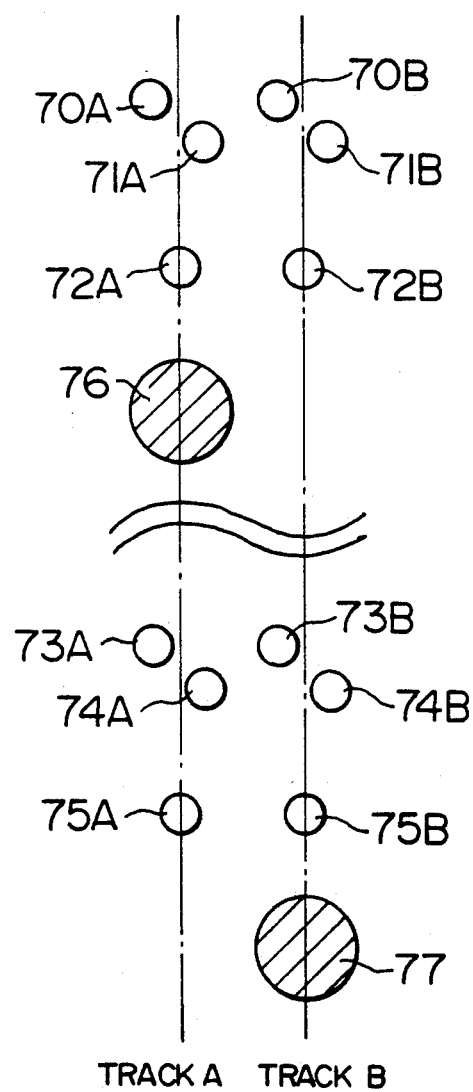
FIG. 3 is a schematic view showing an arrangement of tracks of an opto-magnetic disk.

21 is a magnetic head for providing a magnetic field at the position of the beam spot formed on the recording film of the opto-magnetic disk by the objective lens 7. The laser beams 2a and 2b form beam spots 76 and 77 on tracks A and B as shown in FIG. 3, respectively. The track A has wobble pits 70A, 71A, 73A and 74A for tracking whereas the track B has wobble pits 70B, 71B, 73B and 74B for tracking. Further, the track A has clock pits 72A and 75A for record synchronization whereas the track B has clock pits 72B and 75B for record synchronization. The track A has a recording area provided between 72A and 73A whereas the track B has a recording area provided between 72B and 73B.

In order that the beam spots 76 and 77 track on the tracks A and B of the opto-magnetic disk 1, respectively, first, tracking error of the beam spot 76 for the track A is detected; the tracking actuator 8 is controlled to locate the beam spot 76 on the track A. Next, tracking error of the beam spot 77 for the track B is detected; the image rotary prism 5 is rotary-controlled to locate the beam spot 77 on the track B. In FIG. 1, 30 and 33 are tracking error signal detectors for the laser beam 2b and 2a, respectively; 31 and 34 are equalizers; 32 and 35 are driving amplifiers for controlling the tracking actuator 8 and the rotary actuator 6, respectively; and 30a and 33a are reproduced signals of clock pits on the tracks A and B, respectively; 36 is a controller for setting timings for generation of a reference clock and for start of recording of laser beams 2a and 2b; 37 is an input for information signals; and 38 is a clock separator for writing an information signal in a buffer memory 39 and reading out the information signal at the timing of a clock 36d supplied from the controller 36 to send it to an S/P (serial/parallel signal converter) 40.

41 and 46 are encoders for executing an encode operation in synchronism with a clock signal for modulating a magnetic field; 42 and 47 are buffer memories the contents of which are sent to modulators 44 and 49 at the timing of a clock 36d; the modulators 44 and 49 serve to switch a read operation and a reproduction operation by an R/W (read/write) switching signals 45 and 50 and modulate the laser beams 2a and 2b emitted from the laser 2. 51 is an amplifier for supplying the modulated signal to the magnetic head 21.

The operation of the reading/reproducing apparatus shown in FIG. 1 will be explained. First, the write (recording) operation of an information signal 37 on the opto-magnetic disk 1 will be explained. The information signal 37, once stored in the buffer memory 39, is divided into two channels by the S/P 40, and, as explained later in detail, the modulated signal is supplied to the laser 2 and the magnetic head 21 through the encoders 41 and 46. More specifically, the outputs from the encoders 41 and 46, once stored in the buffer memories 42 and 47, are sent to the modulator 44, 49 by the clock signal 36d; the timing of sending is controlled by the clock 36d and light modulation start/stop pulses 36b and 36c having passed through gates 43 and 48, respectively. In this way, the information signals can be recorded on the recording areas of the tracks of the opto-magnetic disk 1 as shown in FIG. 3 at the positions which are precise relative to the clock pits 72A, 72B, 75A and 75B. In short, the controller 36 serves to create the timing pulses for this purpose.

In operation, the laser beams 2a and 2b emitted from the laser 2 are converted into parallel light beams by the collimator lens 3; they pass through the beam splitter 4 and the image rotary prism 5, and beam spots are formed on the tracks of the opto-magnetic disk 1 by the objective lens 7. The objective lens 7 can be shifted in the radial direction of the disk 1 by the tracking actuator 8 whereas the image rotary prism 5 can be rotated by the rotary actuator 6; then the angles formed by the segment connecting the laser beams and the tracks on the disk 1 can also be varied. Thus, the laser beams (spots) can be made to track on the adjacent tracks of the disk 1 by operating both tracking actuator 8 and rotary actuator 6. In this case, the tracking error signal detector 30 detects a tracking error signal using the reproduced signals of the wobble pits 70A and 71A as shown in FIG. 3. Specifically, since the wobble pits are formed with the offset of a certain distance from the center of the track at issue, a difference between the wobble pits 70A and 71A in their reproduced amplitudes results in the tracking error signal.

The response characteristic of tracking servo is optimized by the equalizer 31. The tracking actuator 8 is shifted by the driving amplifier 32 to cause the laser beam 2a to track on the track A in FIG. 3. Likewise, the tracking error signal of the laser beam 2b is detected by the tracking error signal detector 33; the rotary actuator 6 is controlled through the equalizer 34 and the driving amplifier 35. Additionally, during the recording, the laser beam modulators 44 and 49 can be controlled so that the laser power is not modulated for only the reproduction interval of wobble pits and also is set for a fixed value, thereby maintaining the output levels of the tracking error signal detector 30 and 33 constant. In this way, the gain of the tracking servo can be maintained constant without adding any auxiliary circuit.

The reproduction operation will be executed as follows. Recorded domains are formed as changes of magnetization on the tracks of the disk 1. A light beam reflected when the beam spot 76 scans the magnetic domains is separated into an S wave and P wave by the polarized light beam splitter 10, which are projected onto the photo-detectors 11a and 12a, respectively; they pass through the amplifiers 14 and 15 and are reproduced as an output from the differential amplifier 19. Likewise, the signal reproduced using the beam spot 77 is obtained as an output from the differential amplifier 20. These reproduced signals are decoded and sent to a control unit (not shown) having a function of error correction and an interface with an exterior host computer.

Figure 2A:
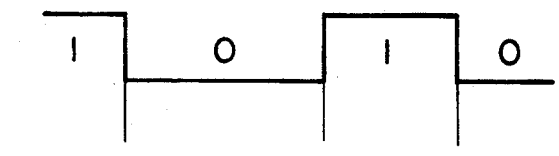
FIGS. 2A to 2F are timing charts showing the operation of the apparatus shown in FIG. 1.
Figure 2B:
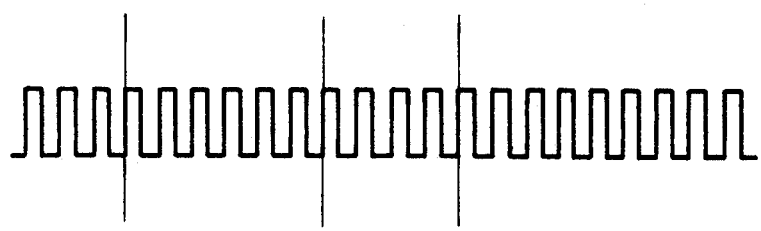
Figure 2C:
Figure 2D:
Figure 2E:
Figure 2F:

FIGS. 2A to 2F are waveform charts for explaining the recording operation of the recording/reproducing apparatus of FIG. 1. FIG. 2A shows the outputs from the encoders 41 and 46. FIG. 2D shows the light output waveforms of laser beams 2a and 2b; although for simplicity of illustration, the same waveform is shown for the laser beams 2a and 2b, they are not the same in an actual operation since the outputs from the encoders are different. FIG. 2B shows the waveform of a clock 36d; FIG. 2C shows the waveform of the intensity of magnetic field in the magnetic head 21; FIG. 2E shows the waveform of temperature of the beam spots 76 and 77 on the recording film; and FIG. 2F shows the recorded domains. To control the temperature of the recording film accurately, the duty ratio of laser output (2a, 2b) could be adjusted.

In accordance with this embodiment, the laser beams 2a and 2b can be amplitude-modulated in synchronism with the magnetic field in the magnetic head 21, thereby permitting overwrite to be made. A slider can be provided so that the magnetic head 21 slides at a certain height (e.g. 10 μm or so) from the recording film of the opto-magnetic disk 1, thereby permitting power for magnetic field modulation to be reduced. The slider may have the same structure as that for a flying head used in a conventional fixed magnetic disk device.

In this embodiment, it is necessary to control the phase between the magnetic field and the modulation of the laser power so that they are in a fixed phase relation. In order to control the phase the detected monitor light from the laser are compared with the detected output of the magnetic field, and the output of the comparator controls the phase of the clocks to be input to the buffer memories 42 and 47.

The detected output of the magnetic field may be detected as a current from the magnetic head 21, or may be detected by a detector provided specially. The phase of clock signals may be controlled by passing the clock signals input to the gates 43 and 48 through a phase modulator or phase shifter, and modulating the outputs from the phase modulator or phase shifter by a phase error signal (a phase modulator or a phase shifter are is not shown in FIG. 1).

Although the S/P (serial/parallel converter) 40 can allot the information signal by one bit to the encoders 41 and 46, it is convenient to allot the information signal in the time base changed for e.g. 512 bytes.

Figure 4:
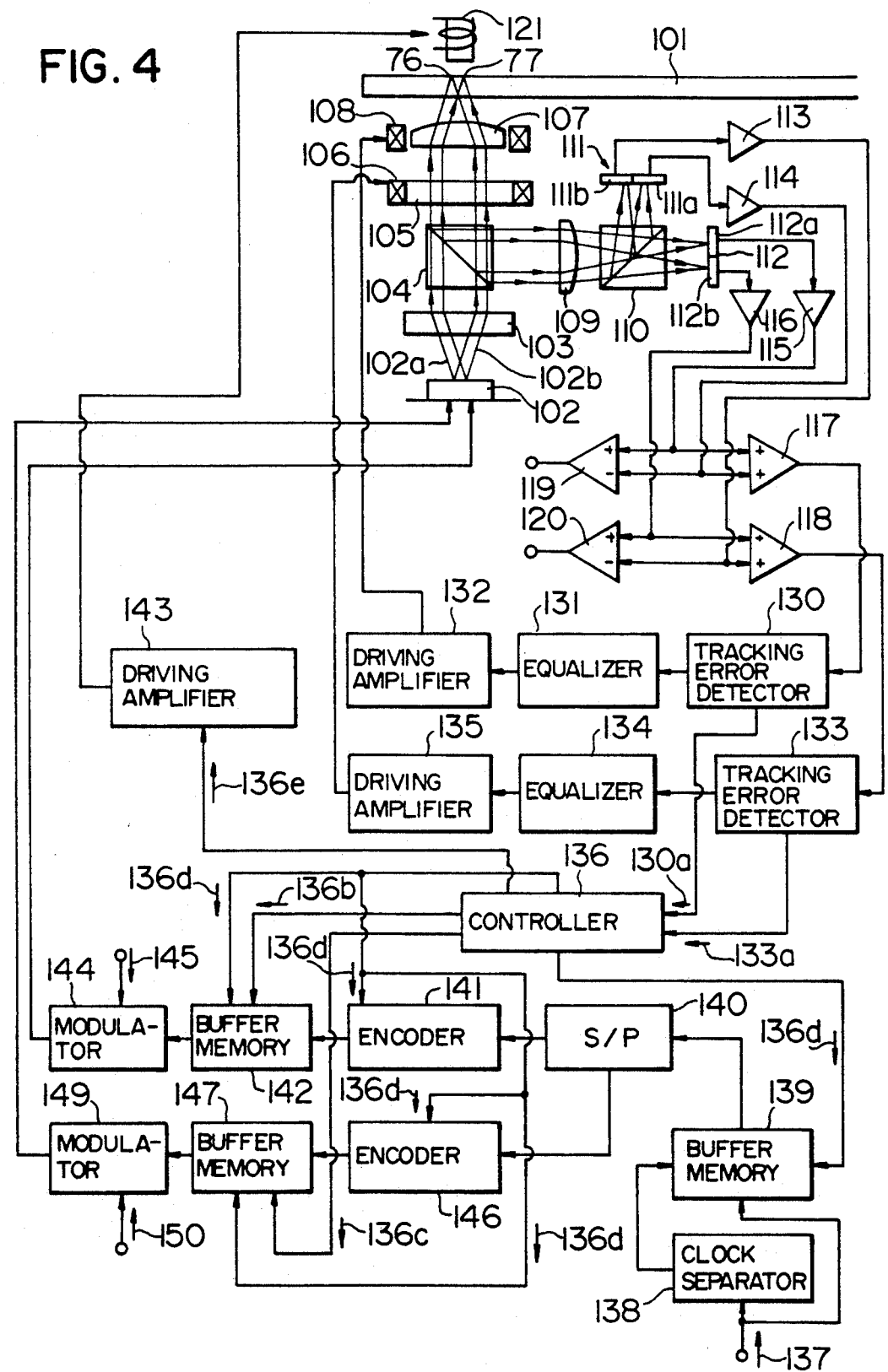
FIG. 4 is a block diagram of another embodiment of the recording/reproducing apparatus according to the present invention.

Now referring to FIGS. 4, 5 and 6, another embodiment of the present invention will be explained. FIG. 4 is a block diagram of the recording/reproducing apparatus according to this embodiment. In FIG. 4, 101 is an opto-magnetic disk; 102 is a double beam laser; 105 is an image rotary prism; 106 is a rotating device provided with a rotary actuator for rotating the image rotary prism 105; 110 is a polarized light beam splitter; 121 is a magnetic head for supplying a biasing magnetic field; 111 and 112 are photo-detectors; 130, 131 and 132 constitute a tracking servo system; 133, 134 and 135 constitute an image rotating control system; 140 is a serial/parallel converter for dividing an information signal into two channels; 141 and 146 are encoders; and 144 and 149 are encoders for modulating the laser beams emitted room the laser 102.

Figure 5:
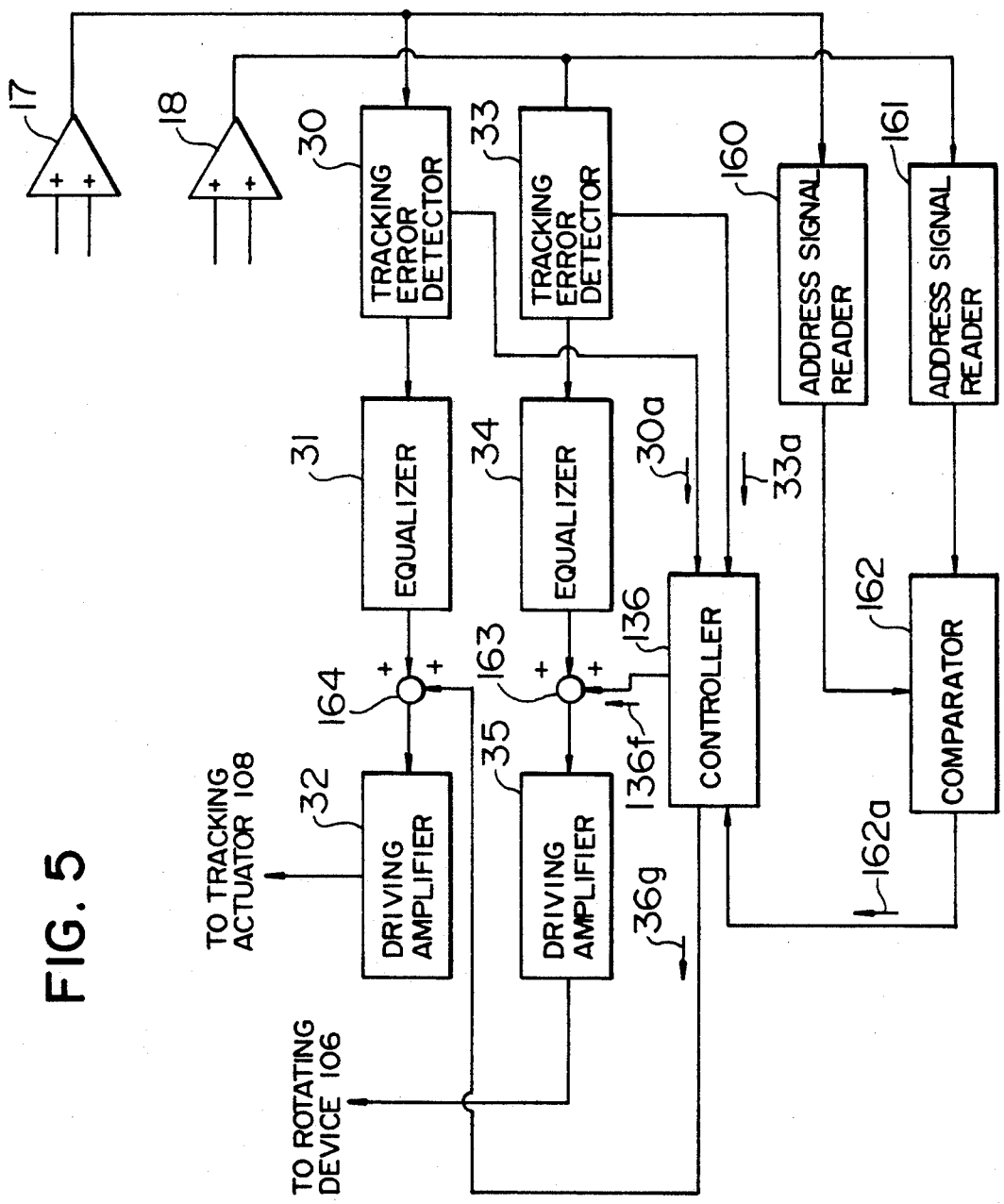
FIG. 5 is a block diagram of a circuit to be added to the block diagram of FIG. 4.

FIG. 5 is a block diagram of a circuit to be added to the recording/reproducing apparatus of FIG. 1. In FIG. 5, 163 and 164 are adders; 160 and 161 are address signal readers; and 162 is an address signal comparator.

Figure 6:
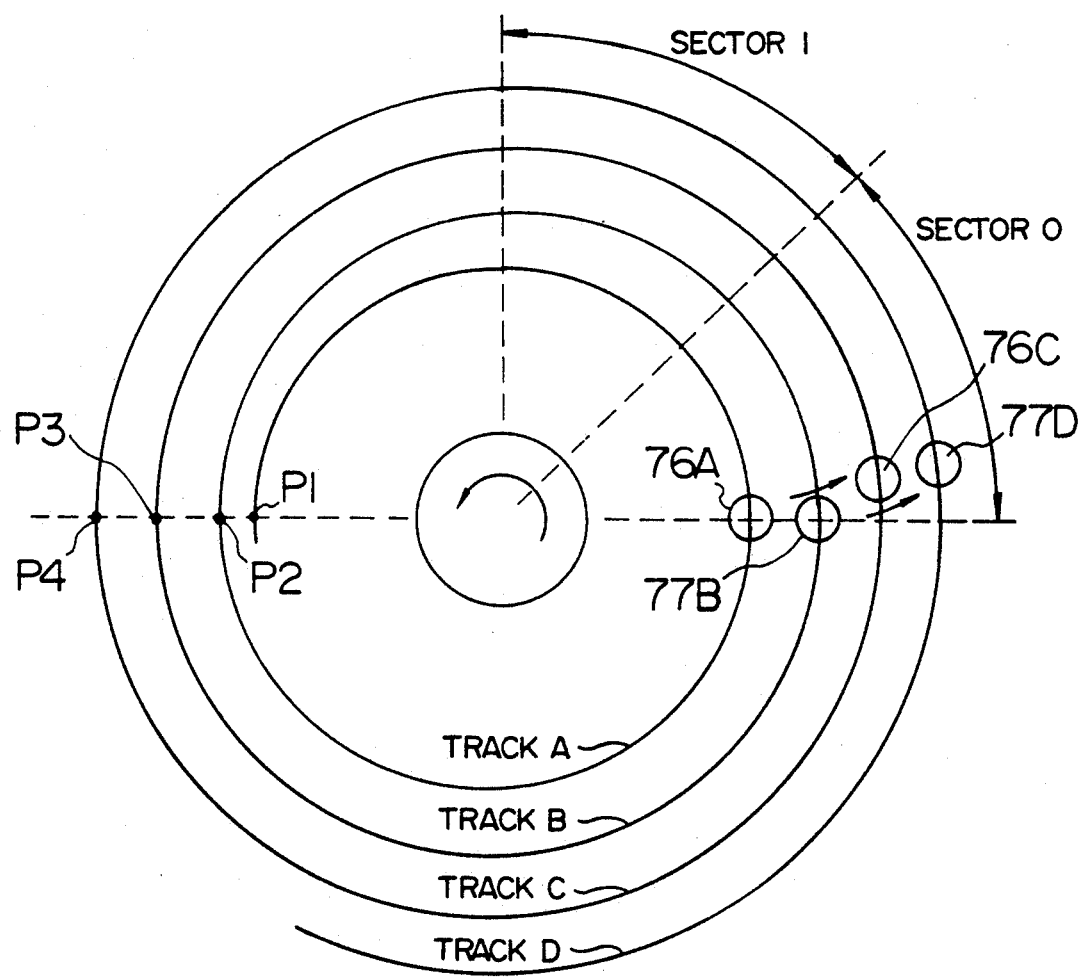
FIG. 6 is a schematic view for explaining the operation of track jumping.
Figure 7:
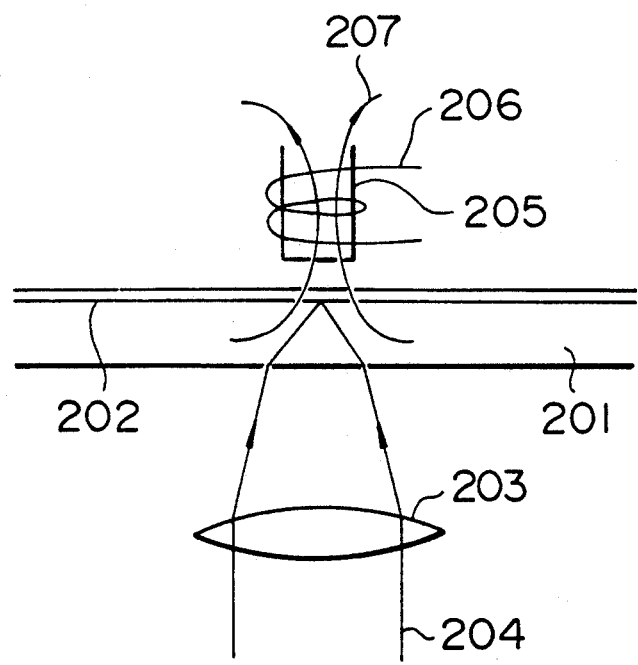
FIG. 7 is a conceptual view of the recording/reproducing system according to the prior art.
Figure 8A:
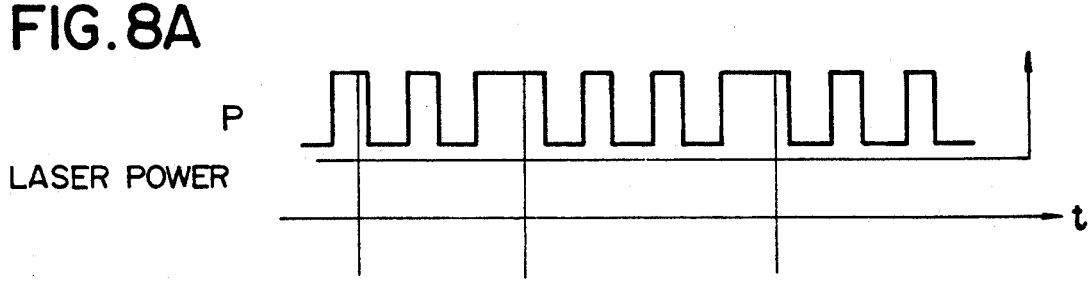
FIGS. 8A to 8E are timing charts for explaining the operation theory of the system of FIG. 7.
Figure 8B:
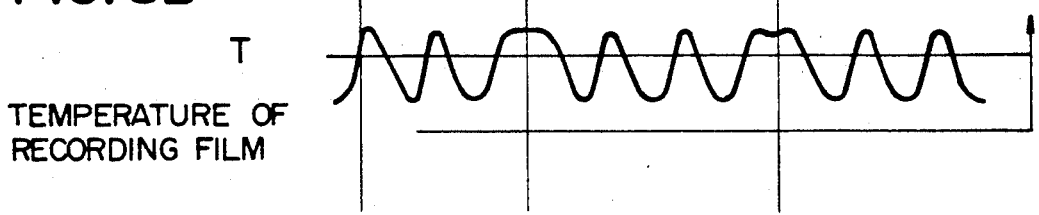
Figure 8C:
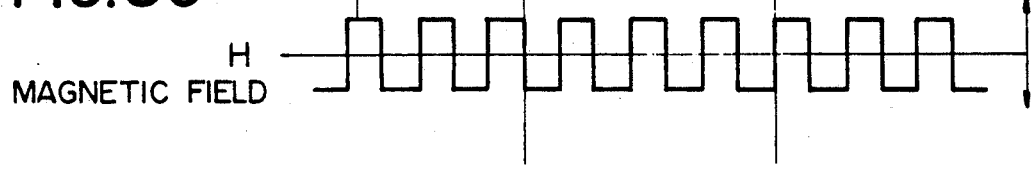
Figure 8D:
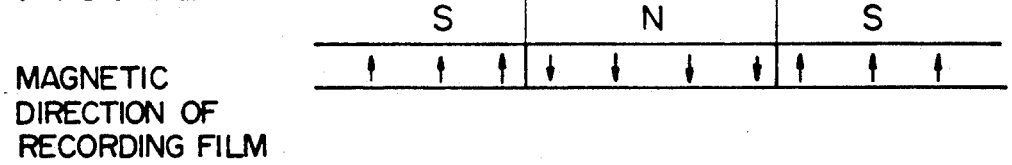
Figure 8E:
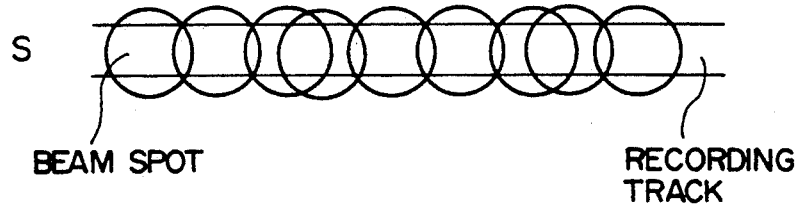
Figure 9:
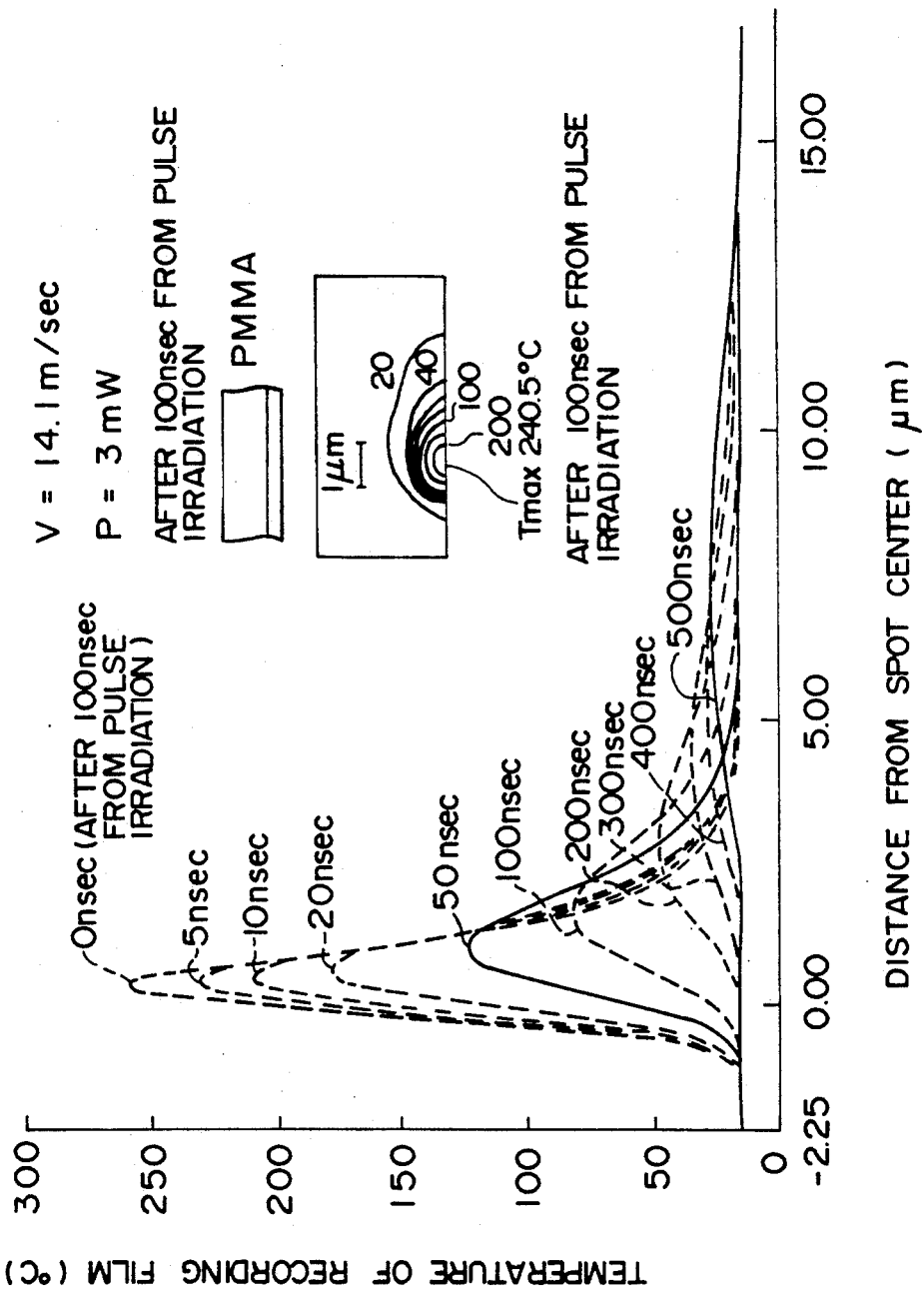
FIG. 9 is a characteristic graph of temperature distribution with passage of time when the recording film of an opto-magnetic disk is irradiated with a laser pulse.

FIG. 6 is a schematic view for explaining the operation of track jumping.

The arrangement of the recording/reproducing apparatus according to this embodiment will be explained in more detail. In FIG. 4, 101 is an opto-magnetic disk; 102 is a semiconductor laser emitting two light beams 102a, 102b; 103 is a collimator lens; 104 is a beam splitter; 105 is an image rotary prism which is e.g. a Dove prism; 106 is a rotary actuator for rotating the prism 105; and 107 is an objective lens which is displaced in a radial direction of the opto-magnetic disk 101 by a tracking actuator 108. The objective lens can be shifted in a focusing direction (not shown). 109 is a lens for enlarging the light beam reflected from the opto-magnetic disk 101 and projecting the images thus formed on photo-detectors 111 and 112 through a polarized light beam splitter 110. 113 and 114 are amplifiers for individually converting two outputs from the two-divided photo-detectors 111a, 111b into voltages; and 115 and 116 are amplifiers for individually converting two outputs from the two-divided photo-detectors 111a, 112b into voltages.

117 is an adder for adding the outputs from the amplifiers 114 and 115; and 118 is an adder for adding the outputs from the amplifiers 113 and 116. Additionally, a laser beam 102a is focused onto the corresponding track of the opto-magnetic disk 101, and the laser beam reflected therefrom is guided to the photo-detectors 111a and 112a. Likewise, a laser beam 102b is guided to the photo-detectors 111b and 112b. Thus, the adder 117 provides an output of an information signal of pre-pit reproduced using the laser beam 102a whereas the adder 118 provides an output of an information signal of pre-pit using the laser beam 102b. Further, a differential amplifier 119 provides an output of the opto-magnetic signal reproduced using the laser beam 102a whereas a differential amplifier 120 provides an output of the opto-magnetic signal reproduced using the laser beam 102b.

121 is a magnetic head for providing a magnetic field at the position of the beam spot formed on the recording film of the opto-magnetic disk 101 by the objective lens 107. The laser beams 102a and 102b form beam spots 76 and 77 on tracks A and B as shown in FIG. 3, respectively. The track A has wobble pits 70A, 71A, 73A and 74A for tracking whereas the track B has wobble pits 70B, 71B, 73B and 74B for tracking. Further, the track A has clock pits (pre-pits for detection of a reference position) 72A and 75A for record synchronization whereas the track B has clock pits 72B and 75B for record synchronization. The track A has a recording area provided between 72A and 73A whereas the track B has a recording area provided between 72B and 73B.

In order that the beam spots 76 and 77 track on the tracks A and B of the opto-magnetic disk 101 respectively, first, tracking error is detected using the beam spot 76 to control the tracking actuator 108, and detected; the image rotary prism 105 is controlled using the beam spot 77. In FIG. 5, 130 and 133 are tracking error signal detectors for the laser beam 102b and 102a, respectively; 131 and 134 are equalizers; 132 and 135 are driving amplifiers for controlling the tracking actuator 108 and the rotary actuator 106, respectively; and 130a and 133a are reproduced signals of clock pits on the tracks A and B, respectively; 136 is a controller for setting timings for generation of a reference clock and for start of recording of laser beams 102a and 102b; 137 is an input for information signals; and 138 is a clock separator for writing an information signal in a buffer memory 139 and reading out the information signal at the timing of a clock 136d supplied from the controller 136 to send it to an S/P (serial/parallel signal converter) 140.

141 and 146 are encoders for executing an encode operation in synchronism with a clock signal 142 and 147 are buffer memories the contents of which are sent to modulators 144 and 149 at the timing of a clock 136d. Incidentally, the timings of start and stop of this sending are determined by a start pulse and a stop pulse for light modulation; the modulated signals are recorded at the positions fixed in relation to the clock pits 72A, 72B, 75A and 75B. The modulators 144 and 149 serve to switch a read operation and a reproduction operation by an R/W (read/write) switching signals 145 and 150; during the write operation, the laser emission power is set for a larger value, whereas during the reproduction, it is set for a smaller value. Thus, the modulators 144 and 149 modulate the laser beams 102a and 102b emitted from the laser 102. 143 is an amplifier for supplying a current generating a magnetic field for recording and erasing to the magnetic head 121. The operation of the reading/reproducing apparatus shown in FIG. 4 will be explained. First, the write (recording) operation of an information signal 137 on the optomagnetic disk 101 will be explained. The information signal 137, once stored in the buffer memory 139, is divided into two channels by the S/P 140, and is supplied to the modulators 144 and 149 through the encoders 141 and 148. More specifically, the outputs from the encoders 141 and 146, once stored in the buffer memories 142 and 147, are sent to the modulators 145 and 150 using the clock signal 136d; the timing of sending is controlled by the light modulation start/stop pulses 136b and 136c, respectively. In this way, the information signals can be recorded on the recording areas of the tracks of the opto-magnetic disk 101 as shown in FIG. 3 at the positions which are precise relative to the clock pits 71A, 72B, 75A and 75B. In short, the controller 136 serves to create the timing pulses for this purpose. 136e is a signal for controlling a biasing magnetic field, i.e. a signal for generating a magnetic field for recording and erasing in the magnetic head 121 through the driving amplifier 143. This signal is sent in cooperation with the signals 145 and 150 for switching of the read/write operation.

In operation, the laser beams 102a and 102b emitted from the laser 102 are converted into parallel light beams by the collimator leans 103; they pass through the beam splitter 104 and the image rotary prism 105, and beam spots are formed on the tracks of the opto-magnetic disk 101 by the objective lens 107. The objective lens 107 can be shifted in the radial direction of the disk 101 by the tracking actuator 108 whereas the image rotary prism 105 can be rotated by the rotary actuator 106; then the angles formed by the segment connecting the laser beams and the tracks on the disk 101 can also be varied. Thus, the laser beams (spots) can be made to track on the adjacent tracks of the disk 101 by operating both tracking actuator 108 and rotary actuator 106. In this case, the tracking error signal detector 130 detects a tracking error signal using the reproduced signals of the wobble pits 70A and 71A as shown in FIG. 3. Specifically, since the wobble pits are formed with the offset of a certain distance from the center of the track at issue, a difference between the wobble pits 70A and 71A in their reproduced amplitudes results in the tracking error signal.

The response characteristic of tracking servo is optimized by the equalizer 131. The tracking actuator 108 is shifted by the driving amplifier 132 to cause the laser beam 102a to track on the track A in FIG. 3. Likewise, the tracking error signal of the laser beam 102b is detected by the tracking error signal detector 133; the rotary actuator 106 is controlled through the equalizer 134 and the driving amplifier 135. Thus, the laser beam is caused to track on the track B.

Additionally, during the recording, the laser beam modulators 144 and 149 can be controlled so that the laser power is not modulated for only the reproduction interval of wobble pits and also is set for a fixed value, thereby maintaining the output levels of the tracking error signal detectors 130 and 133 constant. In this way, the gain of the tracking servo can be maintained constant without adding any auxiliary circuit.

The reproduction operation will be executed as follows Recorded domains are formed as changes of magnetization on the tracks of the disk 101. A light beam reflected when the beam spot 76 scans the magnetic domains is separated into an S wave and P wave by the polarized light beam splitter 110, which are projected onto the photo-detectors 111a and 112a, respectively; they pass through the amplifiers 114 and 115 and reproduced as an output from the differential amplifier 119. Likewise, the signal reproduced using the beam spot 77 is obtained as an output from the differential amplifier 120. These reproduced signals are decoded and sent to a control unit (not shown) having a function of error correction and an interface with an exterior host computer.

FIG. 5 shows a block for causing the beam spots 76 and 77 to track on adjacent tracks and recording information signals at the positions apart from the clock pits 72A, 72B, 75A and 75B by the same distance. This block is used in addition to the block of FIG. 4; the parts not shown in FIG. 5 are the same as those of FIG. 4. In FIG. 5, 160 and 161 are address readers for reading the address signals on the tracks A and B, respectively and 162 is a comparator for comparing the outputs from address readers 160 and 161 to provide a difference 162a between them. This output 162a is sent to a controller 136. The controller 136 produces a track jumping pulse 136f when the difference reaches a prescribed value (the address signals are previously set on the tracks of the disk). The rotary actuator 106 is rotated stepwise by the jumping pulse 136f so that the laser beams 102a and 102b can scan the prescribed tracks (It should be noted that the system of FIG. 5 may be applied to a double spiral optical disk with the tracks provided doubly).

Meanwhile, when the laser beams 102a and 102b scan spiral tracks, as shown in FIG. 6, the track A once scanned by the one laser beam spot 76A will be scanned by the other laser beam spot 77B. In order to avoid this, a jumping pulse 136g is supplied to the tracking actuator 108 through an adder 164 for each progression of one track. Therefore, the laser beam spots 76A and 77B jump every two tracks to the laser beam spots 76C and 77D, thereby executing read/write for the tracks C and D. The start and stop of each track are represented by P1, P2, P3 and P4. It takes a certain time (several hundreds $\mu$sec) for the track jumping so that if successive recording is to be made, one sector may be jumped or a special sector for track jumping may be provided.

Although the S/P (serial/parallel converter) 140 can allot the information signal by one bit to the encoders 141 and 146, it is convenient to allot the information signal in the time base changed for e.g. 512 bytes.

In the case where three or more beams are to be used, the tracking operation is performed using one beam, the image rotary prism is controlled using another beam, and the remaining beam(s) are mechanically fixed.

Although the above embodiments have been explained in terms of a sample servo system using wobble pits, they can be applied to a far field tracking servo system using continuous grooves; in this case, the prepit for detection of a reference position may be that of an address signal, or sync. signal.

In accordance with the present invention, a plurality of laser beams can be tracked on a plurality of tracks to record and reproduce information signals, and also a special disk such as a 'double spiral' optical disk is not required. An optical disk having concentric but not spiral tracks may be also used. In this case also, track jumping may be made every plural tracks so that the optical disk for signal beam recording can be applied to plural beam recording, thereby removing necessity of increasing the kinds of optical disks.

Further, in accordance with the present invention, overwrite using two tracks and two beams can be realized by a single magnetic field modulator, thereby increasing the transmission speed of information signals in a simple structure. Further, unlike the conventional magnetic modulation system, a wide band is not required for the field modulator. Further, in accordance with the present invention, the temperature of the recording film of the opto-magnetic disk necessarily exceeds the Curie point when the magnetic field changes from the polarity of N to that of S, or vice versa, so that the time interval between the recorded domains in which the degree of magnetization is recorded with high accuracy can be controlled with high precision.

Further, using an optical disk having usual spiral or concentric tracks, information signals can be recorded on the tracks at their different positions while plural laser beams individually detect the positions of the tracks being scanned.

Further, plural laser beams are tracked on concentric or spiral tracks, and they are modulated by the signals obtained by dividing a single channel information signal into plural channels thereby to record the signals on the tracks at their different positions. During reproduction, the information signals recorded at the different positions are simultaneously reproduced using the plurality of laser beams to be restored to the original single channel information signal. Further, the spiral or concentric tracks can be replaced by the arrangement of tracks for recording/reproduction using a single beam. Therefore, compatibility can be made between the optical disk using a single laser beam for recording/reproduction and that using plural laser beams therefor.

I claim:

1. A recording and reproducing apparatus for recording and reproducing an information signal on and from an optical disk having a plurality of tracks each including wobble pits for use in detecting a tracking error signal, clock pits for use in generating a reference position for recording the information signal, and address information signals, said apparatus comprising:

a laser means for generating and projecting at least two laser beams onto an optical disk;

an optical system including a tracking servo means for generating a tracking error signal by detecting relative positions of said at least two laser beams and said wobble pits and, based upon said tracking error signal, for providing an output signal to control said laser means to cause said laser beams to track respectively on at least two tracks of said plurality of tracks of said optical disk;

a first buffer memory storing data representing the information signal to be recorded;

serial/parallel converter means for receiving said data represented the information signal to be recorded from said first buffer memory and for dividing said data into at least two data signals respectively belonging to at least two channels to reduce a transmission speed;

at least two detectors, corresponding respectively to said at least two channels, for detecting the clock pits on said at least two tracks from said at least two laser beams when they are reflected from the optical disk and generating a signal each time one of said clock pits on said at least two tracks is detected;

a second buffer memory means for receiving and storing said at least two data signals;

a controller for generating a start/stop signal in response to said signal indicating detection of one of said clock pits to control timing of (i) storing the at least two data signals in said second buffer memory means and (ii) reading the at least two data signals from said second buffer memory means in order to record the at least two data signals at predetermined positions on said at least two tracks relative to locations of respective clock pits thereon;

at least two address detectors for respectively detecting said address information signals provided on said at least two tracks of said optical disk from said at least two laser beams when they are reflected from the optical disk and providing at least first and second outputs respectively representing said address information signals on said at least two tracks;

a comparator means for receiving and comparing said first and second outputs and providing an output representing a difference between said first and second outputs;

said controller receiving and comparing said output from said comparator with a predetermined value and producing a track jumping signal when said difference between said first and second outputs reaches said predetermined value; and said optical system including means for adding the track jumping signal to said tracking error signal generated by said tracking servo means to obtain a track jump drive signal which is provided to said laser means to cause said at least two laser beams to undergo a track jump, whereby said track jump prevents one of said at least two laser beams from recording erroneously an information signal onto an information signal which has already been recorded by another of said at least two laser beams.

2. A recording and reproducing apparatus for recording and reproducing an information signal on and from an optical disk having a plurality of tracks each including wobble pits for use in generating a tracking error signal, clock pits for use in detecting a reference position for recording the information signal, and address information signals, said apparatus comprising:

(a) a laser means for generating and projecting at least two laser beams onto an optical disk;

(b) an optical system for generating an output signal to control said laser means to cause said laser beams to track respectively on at least two tracks of said plurality of tracks of said optical disk, said optical system including:

(i) a tracking actuator means for moving said at least two laser beams radially of said optical disk;

(ii) a rotary actuator means for moving said at least two laser beams to vary angles which they form with a line connecting said at least two laser beams and said at least two tracks when said at least two laser beams are projected upon said at least two tracks;

(iii) tracking servo means for generating (i) a first tracking error signal for one of said at least two laser beams by detecting a relative position between said one of said at least two laser beams and said wobble pits of the one of said at least two tracks on which said one of said at least two laser beams is currently intended to track and (ii) a second tracking error signal for another one of said at least two laser beams by detecting a relative position between said another one of said at least two laser beams and said wobble pits of the one of said at least two tracks on which said another one of said at least two laser beams is currently intended to track;

(iv) means for controlling said tracking actuator means to move said one of said at least two laser beams radially of said optical disk in response to said first tracking error signal; and (v) means for controlling said rotary actuator means to move said another one of said at least two laser beams radially of said optical disk in response to said second tracking error signal;

(c) a first buffer memory storing data representing the information signal to be recorded;

(d) serial/parallel converter means for receiving said data representing the information signal to be recorded from said first buffer memory and for dividing said data into at least two data signals respectively belonging to at least two channels to reduce a transmission speed;

(e) at least two detectors, corresponding respectively to said at least two channels, for detecting the clock pits on said at least two tracks from said at least two laser beams when they are reflected from the optical disk and generating a signal each time one of said clock pits on said at least two tracks is detected;

(f) a second buffer memory means for receiving and storing said at least two data signals;

(g) a controller for generating a start/stop signal in response to said signal indicating detection of one of said clock pits to control timing of (i) storing the at least two data signals in said second buffer memory means and (ii) reading the at least two data signals from said second buffer memory means in order to record the at least two data signals at predetermined positions on said at least two tracks relative to locations of respective clock pits thereon;

(h) at least two address detectors for respectively detecting said address information signals provided on said at least two tracks of said optical disk from said at least two laser beams when they are reflected from the optical disk and providing at least first and second outputs respectively representing said address information signals on said at least two tracks;

(i) a comparator means for receiving and comparing said first and second outputs and providing an output representing a difference between said first and second outputs;

(j) said controller receiving and comparing said output from said comparator with a predetermined value and producing a track jumping signal when said difference between said first and second outputs reaches said predetermined value; and (k) said optical system including means for adding the track jumping signal to said tracking error signal generated by said tracking servo means to obtain a track jump drive signal which is provided to said laser means to cause said at least two laser beams to undergo a track jump, (l) wherein said track jump prevents one of said at least two laser beams from recording erroneously an information signal onto an information signal which has already been recorded by another of said at least two laser beams.

3. A recording and reproducing system comprising:
an optical disk; and
a recording and reproducing apparatus;

said optical disk having a plurality of tracks each including wobble pits for use in generating a tracking error signal, clock pits for use in detecting a reference position for recording the information signal, and address information signals;

said apparatus comprising:

a laser means for generating and projecting at least two laser beams onto an optical disk;

an optical system including a tracking servo means for generating a tracking error signal by detecting relative positions of said at least two laser beams and said wobble pits and, based upon said tracking error signal, for providing an output signal to control said laser means to cause said laser beams to track respectively on at least two tracks of said plurality of tracks of said optical disk;

a first buffer memory storing data representing the information signal to be recorded;

serial/parallel converter means for receiving said data representing the information signal to be recorded from said first buffer memory and for dividing said data into at least two data signals respectively belonging to at least two channels to reduce a transmission speed;

at least two detectors, corresponding respectively to said at least two channels, for detecting the clock pits on said at least two tracks from said at least two laser beams when they are reflected from the optical disk and generating a signal each time one of said clock pits on said at least two tracks is detected;

a second buffer memory means for receiving and storing said at least two data signals;

a controller for generating a start/stop signal in response to said signal indicating detection of one of said clock pits to control timing of (i) storing the at least two data signals in said second buffer memory means and (ii) reading the at least two data signals from said second buffer memory means in order to record the at least two data signals at predetermined positions on said at least two tracks relative to locations of respective clock pits thereon;

at least two address detectors for respectively detecting said address information signals provided on said at least two tracks of said optical disk from said at least two laser beams when they are reflected from the optical disk and providing at least first and second outputs respectively representing said address information signals on said at least two tracks;

a comparator means for receiving and comparing said first and second outputs and providing an output representing a difference between said first and second outputs;

said controller receiving and comparing said output from said comparator with a predetermined value and producing a track jumping signal when said difference between said first and second outputs reaches said predetermined value; and said optical system including means for adding the track jumping signal to said tracking error signal generated by said tracking servo means to obtain a track jump drive signal which is provided to said laser means to cause said at least two laser beams to undergo a track jump, whereby said track jump prevents one of said at least two laser beams from recording erroneously an information signal onto an information signal which has already been recorded by another of said at least two laser beams.

* * * * *